United States Patent [19]

McAuliffe

[11] 4,093,896
[45] June 6, 1978

[54] SPEED CONTROL FOR ROTATABLE ELEMENT DRIVEN BY DIRECT CURRENT MOTORS

[75] Inventor: Gerald N. McAuliffe, Lincoln, Nebr.

[73] Assignee: Outboard Marine Corporation, Waukegan, Ill.

[21] Appl. No.: 713,399

[22] Filed: Aug. 11, 1976

[51] Int. Cl.² .............................................. H02P 5/46
[52] U.S. Cl. ...................................... 318/45; 318/59; 318/67; 318/8
[58] Field of Search ...................... 318/67, 45, 59, 83, 318/8, 514, 349

[56] References Cited

U.S. PATENT DOCUMENTS

| | | | |
|---|---|---|---|
| 3,416,059 | 12/1968 | Lagier | 318/514 |
| 3,771,032 | 11/1973 | Hender | 318/8 |
| 3,799,284 | 3/1974 | Hender | 318/8 |
| 3,832,616 | 8/1974 | Vinner | 318/67 |
| 3,925,713 | 12/1975 | Richmond | 318/8 X |

Primary Examiner—B. Dobeck
Attorney, Agent, or Firm—Michael, Best & Friedrich

[57] ABSTRACT

Disclosed herein is a control comprising a rotatably supported wheel, a first direct current motor, means drivingly connecting the first direct current motor to the wheel with a first drive ratio, a second direct current motor, means drivingly connecting the second direct current motor to the wheel with a second drive ratio lower than the first drive ratio, a source of direct current, and a switch electrically connected to the source of direct current and to the first and second direct current motors and including a contact arm for initially electrically connecting the direct current source to the first direct current motor whereby to drive the wheel at a slow speed, and for subsequently additionally electrically connecting the source of direct current to the second direct current motor while maintaining electrical connection of the direct current source to the first direct current motor, whereby to drive the wheel at a fast speed.

11 Claims, 4 Drawing Figures

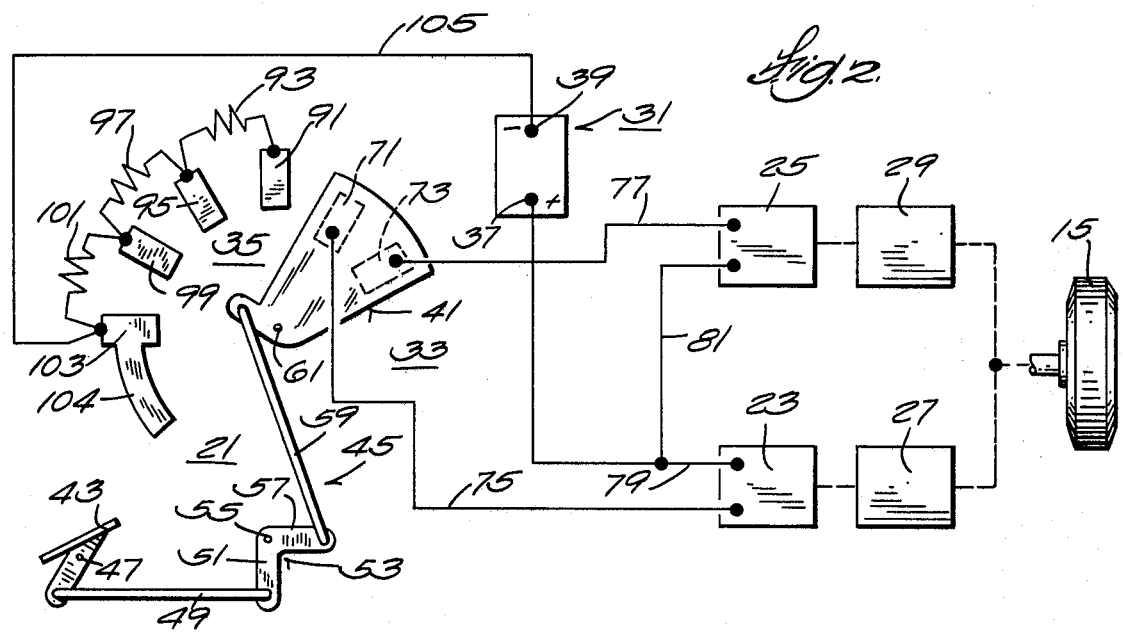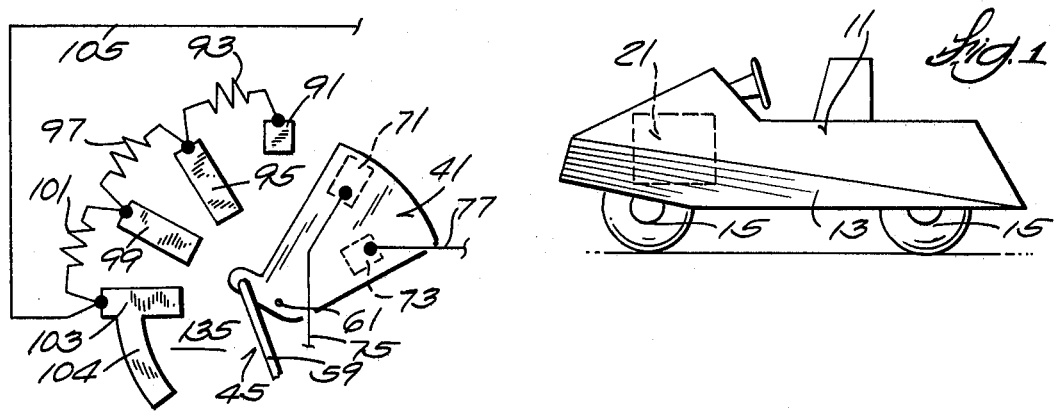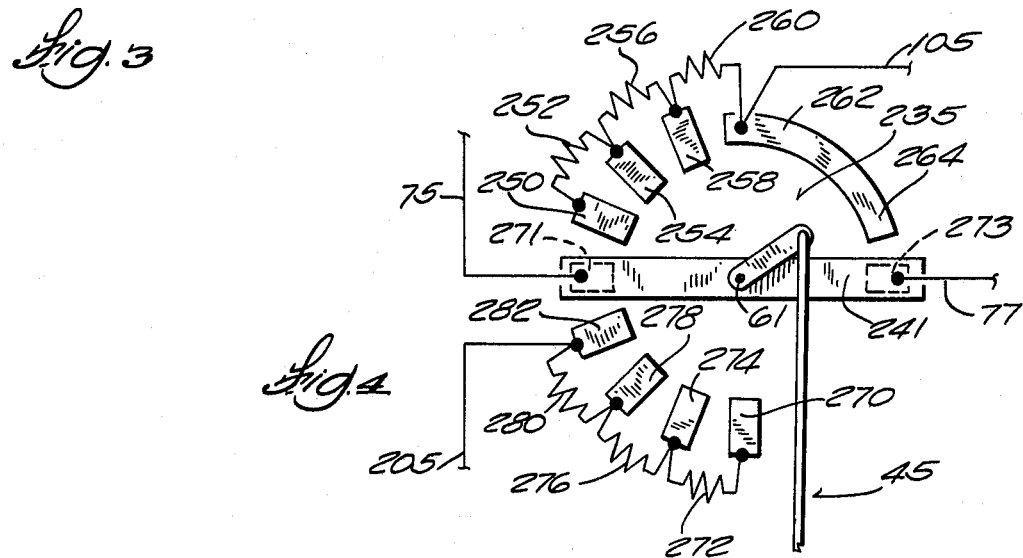

SPEED CONTROL FOR ROTATABLE ELEMENT DRIVEN BY DIRECT CURRENT MOTORS

BACKGROUND OF THE INVENTION

The invention relates generally to drive controls or drive mechanisms for controlling rotation of a drive wheel or other rotatable element driven by a direct current electrical motor. The invention also relates to such controls or mechanisms in which the drive wheel or element is driven by two direct current motors.

SUMMARY OF THE INVENTION

The invention provides a drive control comprising a frame, an element rotatably supported by the frame, a first direct current motor on the frame, means drivingly connecting the first direct current motor to the element with a first speed reducing ratio, a second direct current motor on the frame, means drivingly connecting the second direct current motor to the element with a second speed reducing ratio lower than the first speed reducing ratio, a source of direct current, and a switch mounted on the frame and electrically connected to the source of direct current and to the first and second direct current motors and including means for initially electrically connecting the direct current source to the first direct current motor whereby to drive the element at a slow speed, and for subsequently additionally electrically connecting the source of direct current to the second direct current motor while maintaining electrical connection of the direct current source to the first direct current motor, whereby to drive the element at a fast speed.

In one embodiment in accordance with the invention, the connecting means includes a movably mounted contact arm and the drive control further includes a foot pedal mounted on the frame for movement, and means connecting the foot pedal to the contact arm for moving the contact arm in response to foot pedal movement.

In one embodiment in accordance with the invention, the switch includes a contact arm having a first brush electrically connected to the first direct current motor and a second brush electrically connected to the second direct current motor, which contact arm is movable between an off position, a slow speed position, and a fast speed position, and a first contact located for electrical engagement solely by the first brush when the contact arm is in the slow speed position, a resistor electrically connected to the first contact, and a second contact electrically connected to the first resistor and to the source of direct current and dimensioned for simultaneous electrical engagement by both of the first and second brushes when the contact arm is in the fast speed position.

In one embodiment of the invention, the contact arm is movable to first and second intermediate speed positions between the fast speed position and the low speed position and the switch further includes a first intermediate contact and a second resistor electrically connected to each other in series and interposed between the first-mentioned resistor and the second contact with the intermediate contact electrically connected to the first-mentioned resistor and with the second resistor electrically connected to the second contact. The intermediate contact is located so that, when the contact arm is in the first intermediate position, the first brush is electrically engaged therewith and the second brush is electrically engaged with the first contact so as to drive the element at a first speed intermediate the fast and low speed, and being located so that, when the contact arm is in the second intermediate position, the first brush is electrically engaged with the second contact and the second brush is electrically engaged with the intermediate contact so as to drive the element at a second intermediate speed faster than the first intermediate speed and slower than the fast speed.

In one embodiment in accordance with the invention, the connecting means includes a movably mounted contact arm having a first brush electrically connected to one of the first direct current motor and the direct current source and a second brush electrically connected to one of the second direct current motor and the direct current source, which contact arm is movable between an off position and a series of positions affording driving of said element at increasing speeds. The connecting means also includes a first series of contacts located for successive engagement by the first brush and including a first series of resistors electrically connected between the contacts of the first series thereof, and a second series of contacts located for successive engagement by the second brush and including a second series of resistors electrically connected between the contacts of the second series thereof, the last of the first series of contacts being electrically connected to the other of the first direct current motor and direct current source and located and dimensioned such that the first brush is engageable therewith simultaneously with electrical engagement of the second brush with the second series of contacts and the last of the second series of contacts being electrically connected to the other of said second direct current motor and the direct current source.

One of the principal features of the invention is switching apparatus for controlling operation of elements rotated by direct current motors so as to reduce arcing problems associated with high current densities encountered during speed controlling switching.

Another of the principal features of the invention is switching apparatus for controlling operation of elements rotated by direct current motors so as to decrease power requirements at low speed.

The features of reducing arcing and of decreasing power requirements are obtained by employing dual electric motors in a switching arrangement in accordance with the invention.

Another of the features of the invention is the provision of a power train using two direct current motors geared at different ratios to the driven element instead of using one motor of equal power. The motor with the highest speed reducing ratio is energized for slower speed operation. Both motors are used for higher speed operation.

The disclosed switching arrangement is of particular value where a vehicle has considerable low speed requirements, as only one motor is energized when the vehicle is operated in slow speed mode, and as, at other times, both motors are energized for high speed operation.

Other features of the invention include lower current draw for each switch stage, lower battery drain at low speeds, and more compact switch design.

Other additional features and advantages of the embodiments of the invention will become known by reference to the following general description, appended claims, and accompanying drawings,

The Drawings

FIG. 1 is a schematic view of a vehicle incorporating various of the features of the invention.

FIG. 2 is a schematic view illustrating a drive mechanism or control incorporated in the vehicle shown in FIG. 1.

FIG. 3 is a schematic view of a modified switch adapted to be incorporated in the drive mechanism incorporated in the vehicle shown in FIG. 1.

FIG. 4 is a schematic view of another modified switch adapted to be incorporated in the drive mechanism incorporated in the vehicle shown in FIG. 1.

Before explaining the embodiments of the invention in detail, it is to be understood that the invention is not limited in its applications to the details of constuction and the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

General Description

Shown schematically in FIG. 1 is a vehicle 11 including a frame 13 which rotatably supports a series of wheels 15, at least one of which is a drive wheel. The drive wheel or wheels 15 are arranged to be driven by a drive mechanism, or control, or system 21 which is shown in FIG. 2 and which includes first and second direct current motors 23 and 25 which, in turn, are connected through respective first and second transmission 27 and 29 with the drive wheel 15 as shown schematically in FIG. 2. Any suitable direct current motors can be employed. Preferably the direct current motors 23 and 25 include series connected armatures and field windings (not shown). The motors 23 and 25 can be of identical construction or can be of different capacities. The first transmission 27 which connects the first direct current motor 23 to the drive wheel 15 includes a relatively high, speed reducing ratio so that, for a given motor speed, the drive wheel 15 will rotate at a relatively low speed. The second transmission 29 which connects the second motor 25 to the drive wheel 15 includes a relatively low, speed reducing ratio so that, in response to a given motor speed, the drive wheel 15 will operate at an increased or relatively fast speed level.

The motors 23 and 25 are selectively actuated and connected to a direct current source 31 by a circuit 33 which includes a switch 35 supported by the frame 13 and operative to selectively connect the direct current source 31 to the motors 23 and 25. Any suitable source of direct current can be employed. In this regard, one or more batteries can be employed, connected either in series or in parallel. In the illustrated construction, the direct current source 31 includes a positive terminal 37 and a negative terminal 39.

The switch 33 includes a movably mounted contact arm 41 which is connected by a linkage 45 to an actuator which is movably mounted on the frame 13, and which can be in the form of a foot pedal 43 such that depression of the foot pedal 43 causes movement of the contact arm 41. It is to be understood that any type of movable actuater, such as the foot pedal 43, can be employed to actuate the contact arm 41.

More specifically, the foot pedal 43 is mounted on a pivot 47 supported by the frame 13 and is pivotally connected to a link 49 which, in turn, is pivotally connected to one leg 51 of a bell crank lever 53 which is pivotally supported on a rock shaft 55 which is rotatably mounted on the frame 13. The other leg 57 of the bell crank lever 53 is pivotally connected to a link 59 which, in turn, is connected to the control arm 41 which is mounted for pivotal movement about an axis 61 on the frame 13 and which, in response to depression of the foot pedal 43, rotates in the counterclockwise direction as shown in FIG. 2.

Carried by the control arm 41 in angularly spaced relation to each other, are first and second brushes 71 and 73 respectively, which brushes 71 and 73 are respectively electrically connected to the first and second motors 23 and 25 by leads 75 and 77. In turn, the first and second motors 23 and 25 are respectively electrically connected to one of the terminals 37 and 39 of the direct current source 31 by respective leads 79 and 81. In the illustrated construction, the leads 79 and 81 are connected to the positive terminal 37.

The switch 35 also includes contact means located for engagement by the brushes 71 and 73 in response to movement of the contact arm 41 about its pivotal mounting incident to operation of the foot pedal 43. In the construction shown in FIG. 2, the contact means comprises a series of contacts which are electrically connected to each other by intervening resistors. More specifically, the series of contacts includes, a first contact 91, a first resistor 93 electrically connected to the first contact 91, a second contact 95 electrically connected to the first resistor 93, a second resistor 97 electrically connected to the second contact 95, a third contact 99 electrically connected to the second resistor 97, a third resistor 101 electrically connected to the third contact 99, and a fourth contact 103 electrically connected to the third resistor 101, and electrically connected by a lead 105 to the other or negative terminal 39 of the source of direct current 31. As illustrated, the fourth contact 103 includes an extending leg or portion 104 which permits simultaneous engagement of the contact 103 by both of the brushes 71 and 73.

The invention is not limited to the illustrated four contacts and a fewer number or greater number of contacts can be employed.

The series of angularly spaced contacts 91, 95, 99 and 103 are arranged so that movement of the control arm 41 from the illustrated off position in the counterclockwise direction first engages the first brush 71 with the first contact 91 to electrically connect the source of direct current 31 to the first motor 23 with the three resistors 93, 97 and 101 connected therebetween without energizing the second motor 25, thus driving the wheel 15 at a slow speed. During rotation of the wheel 15 powered solely by the first motor 23, the armature of the second motor 25 free wheels.

Further movement of the contact arm 41 in the counterclockwise direction will then engage the first brush 71 with the second contact 95 and simultaneously engage the second brush 73 with the first contact 91, thereby energizing the first motor 23 with only the resistors 97 and 101 in series connection therewith and also energizing the second motor 25 with the resistors 93, 97 and 101 in series connection therewith, thus driving the wheel 15 at a slow intermediate speed greater than the previously mentioned slow speed. Because of the differences in the drive ratio of the transmissions 27 and 29, the first motor 23 will rotate at a faster rate than the second motor 25.

Upon further movement of the contact arm 41 in the counterclockwise direction, the first brush 71 engages the third contact 99 and the second brush 73 engages the second contact 95, thereby electrically connecting the first motor 23 with the direct current source 31 through the resistor 101 and electrically connecting the second motor 25 to the direct current source 31 through the resistors 97 and 101, thus driving the wheel at a fast intermediate speed. Upon further movement of the contact arm 41 in the counterclockwise direction, the first brush 71 engages the fourth contact 103 and the second brush 73 engages the third contact 99, thereby electrically connecting the first motor 23 with the direct current source 31 without any of the resistors 93, 97 and 101 being in series connection therewith and thereby also electrically connecting the second motor 25 with the direct current source 31 with the resistor 101 being in series connection therewith, thus driving the drive wheel at a second intermediate fast speed greater than the first mentioned intermediate fast speed.

Upon still further movement of the contact arm 41 in the counterclockwise direction, the first brush 71 remains in electrical engagement with the first contact 103 and the second brush 73 comes into electrical engagement with the fourth contact 103, thereby connecting both motors 23 and 25 to the direct current source 31 without any intervening resistors and thereby driving the wheel 15 at a fast speed.

From the foregoing, it is apparent that the contacts 91, 95, 99 and 103 are equi-angularly spaced about the axis of contact arm rotation and that the first and second brushes 71 and 73 are angularly spaced about the axis of contact arm rotation at the same spacing as the contacts. If desired, the brushes 71 and 73 could be spaced at an angular distance equal to an even multiple of the angular spacing between the contacts and, in such instance, if the multiple were two, the second motor 25 would not be energized through the first contact 91 until the first brush 71 was in engagement with the third contact 99.

If the multiple were three, the second motor 25 would not be energized through the first contact 91 until the first brush 71 was in engagement with the fourth contact 103.

Thus, the disclosed arrangement can be employed to initiate rotation of a wheel at a low or slow speed through energizing of a first motor connected in series with one or more resistors to a source of direct current and to thereafter, in response to contact arm movement, to successively remove the resistors in series with the first motor and, at some point, to initiate operation of a second motor which is connected to the direct current source in parallel with the first motor and through one or more resistors which can be successively removed in response to contact arm movement. Accordingly, the vehicle is driven first by one motor and then by two motors and at increasing speeds as the contact arm is moved from the off position.

If desired, engagement of the brushes 71 and 73 with the contact 91 can be replaced by engagement with suitable micro-switches arranged to operate solenoids (not shown) so as to rapidly electrically connect the contact 91 to the motors 23 and 25. It is also noted that the contacts are located sufficiently close to one another such that the brushes bridge adjacent contacts when moving from one contact to an adjacent contact, thereby reducing arcing.

Shown in FIG. 3 is another embodiment of a switch 135 which can be incorporated in the circuit 33 shown in FIG. 2 and which is arranged in substantially the same manner as the switch 35 shown in FIG. 2 except as will be explained. In this regard, the same reference numerals have been applied to the components of the switch 135 as have previously been applied to such components of the switch 35 which are of the same or similar construction to the components of the switch 135.

The switch 135 differs from the switch 35 in that, in the switch 135, the second brush 73 is radially closer to the pivot axis 61 of the contact arm 41 than the first brush 71 and in that the contacts 95, 99 and 103 have extended radial length permitting electrical engagement with both the first and second brushes 71 and 73 and in that the contact 91 has limited radial length precluding engagement with the second brush 73. Thus, as the second brush 73 is incapable of engaging the first contact 91, the second brush 73 will not operate to energize the second motor 25 until the first brush 71 is in engagement with the third contact 99. Thus there would be two relatively slow speeds driven solely by the first motor 23 before energizing of the second motor 25. If desired, more of the contacts could be of lesser radial length so as to further delay energizing of the second motor 25.

Shown in FIG. 4 is still another embodiment of a switch 235 which can be incorporated in the circuit 33 shown in FIG. 2. More particularly, the switch 235 includes a contact arm 241 which is rotatable from an off position about the axis 61 in the clockwise direction by the linkage 45 which is shown in FIG. 2 and which is connected to the foot pedal 43. The contact arm 241 includes, in diametrically opposed relation to each other, first and second brushes 271 and 273 which are respectively coupled by the leads 75 and 77 to the first and second motors 23 and 25 as is shown in FIG. 2.

Included in the switch 235 are a first series of series connected contacts including a first contact 250, a first resistor 252 electrically connected to the first contact 250, a second contact 254 electrically connected to the first resistor 252, a second resistor 256 electrically connected to the second contact 254, a third contact 258 electrically connected to the second resistor 256, a third resistor 260 electrically connected to the third contact 258, and a fourth contact 262 electrically connected to the third resistor 260, and electrically connected by the lead 105 to the other or negative terminal 39 of the direct current source 31 shown in FIG. 2.

The contacts 250, 254, 258 and 262 include portions which are equally angularly located with respect to one another at a common distance from the axis 61 of contact arm rotation and so as to be successively engaged by the first brush 271 in response to movement thereof in the clockwise direction from the illustrated off position.

The fourth contact 262 includes a leg or portion 264 which extends in the clockwise direction so as to provide for continued electrical engagement with the first brush 271 over a relatively substantial angular distance as will hereinafter be explained.

Also included in the switch 235 is a second series of contacts which are equally angularly spaced about, and at a common radial distance from, the axis 61 of contact arm rotation and including a first contact 270, a first resistor 272 electrically connected to the first contact 270, a second contact 274 electrically connected to the first resistor 272, a second resistor 276 electrically connected to the second contact 274, a third contact 278 electrically connected to the second resistor 276, a third resistor 280 electrically connected to the third contact 278, and a fourth contact 282 electrically connected to the third resistor 280 and electrically connected by the lead 205 to the other or negative terminal 39 of the direct current source 31 shown in FIG. 2. The second series of contacts is arranged so that the second brush 273 engages the contact 270 upon engagement of the first brush 271 with the contact 262 and such that, as the second brush 273 successively engages the contacts 274, 278 and 282, the first brush 271 remains in engagement with the leg 264 of the fourth contact 262 of the first series so that the first motor 23 is always energized, without intervening resistors, during electrical connection of the second motor 25.

As a consequence, and after the foot pedal 43 is operated to energize the first motor 23 through three initial power levels affording rotation of the wheel 15 at increasing speed levels, when the first brush 271 comes into engagement with the fourth contact 262, all of the resistors 252, 256 and 260 are disconnected from the first motor 23 and, in addition, the second brush 273 comes into engagement with the contact 270 so as to thereby engage the second motor 25 to the source of direct current 31 in parallel with engagement of the first motor 23, and with the resistors 272, 276 and 280 in series connection with the second motor 25. As the contact arm 241 is further rotated clockwise by further depression of the foot pedal 43, the resistors 272, 276 and 280 are successively removed from series connection with the second motor 25 while the first motor 23 is constantly energized through the fourth contact 262, thereby driving the wheel 15 through a further series of incrementally increasing speed levels. When the second brush 273 engages the fourth contact 282 of the second series, the resistors 272, 276 and 280 are all removed from connection with the second motor 25 and both motors 23 and 25 are drivingly connected in parallel with the source of direct current 31.

If desired, engagement of the second brush 273 with the first contact 270 of the second series of contacts can be delayed so that a separate power level is provided when the first brush 271 comes into initial engagement with the fourth contact 262 of the first series of contacts.

Thus, there is provided a two motor driving system for a drive wheel or other rotatable element, which wheel or element is initially rotated by one motor at a slow speed, which wheel or element, in response to full travel of an actuator such as a foot pedal, is driven at a high speed by both motors connected in parallel to a direct current source, and which wheel or element can be driven at various intermediate speed levels by energizing the second motor after energizing of the first motor and by successively removing resistors in series connection with the motors.

Various of the features of the invention are set forth in the following claims.

What is claimed is:

1. A drive control comprising a frame, an element rotatably supported by said frame, a first direct current motor on said frame, means drivingly connecting said first direct current motor to said element with a first speed reducing ratio, a second direct current motor on said frame, means drivingly connecting said second direct current motor to said element with a second speed reducing ratio lower than said first speed reducing ratio, a source of direct current, and a switch mounted on said frame and electrically connected to said source of direct current and to said first and second direct current motors and including means for initially electrically connecting said direct current source to said first direct current motor whereby to drive said element at a slow speed, and for subsequently additionally electrically connecting said source of direct current to said second direct current motor while maintaining electrical connection of said direct current source to said first direct current motor, whereby to drive said element at a fast speed.

2. A vehicle in accordance with claim 1 wherein said connecting means includes a movably mounted contact arm and further including a foot pedal mounted on said frame for movement, and means connecting said foot pedal to said contact arm for moving said contact arm in response to foot pedal movement.

3. A drive control comprising a frame, an element rotatably supported by said frame, a first direct current motor on said frame, means drivingly connecting said first direct current motor to said element with a first speed reducing ratio, a second direct current motor on said frame, means drivingly connecting said second direct current motor to said element with a second speed reducing ratio lower than said first speed reducing ratio, a source of direct current, and a switch mounted on said frame and electrically connected to said source of direct current and to said first and second direct current motors and including means for initially electrically connecting said direct current source to said first direct current motor whereby to drive said element at a slow speed, and for subsequently additionally electrically connecting said source of direct current to said second direct current motor while maintaining electrical connection of said direct current source to said first direct current motor, whereby to drive said element at a fast speed, said switch including a contact arm having a first brush electrically connected to said first direct current motor and a second brush electrically connected to said second direct current motor, said contact arm being movable between an off position, a slow speed position, and a fasft speed position, and a first contact located for electrical engagement solely by said first brush when said contact arm is in said slow speed position, a resistor electrically connected to said first contact, and a second contact electrically connected to said first resistor and to said source of direct current and dimensioned for simultaneous electrical engagement by both of said first and second brushes when said contact arm is in said fast speed position.

4. A drive control in accordance with claim 3 wherein said contact arm is movable to first and second intermediate speed positions between said fast speed position and said low speed position and wherein said switch further includes a first intermediate contact and a second resistor electrically connected to each other in series and interposed between said first-mentioned resistor and said second contact with said intermediate contact electrically connected to said first-mentioned resistor and with said second resistor electrically connected to said second contact, said intermediate contact being located so that, when said contact arm is in said first intermediate position, said first brush is electrically engaged therewith and said second brush is electrically engaged with said first contact so as to drive said element at a first speed intermediate said fast and low speed, and being located so that, when said contact arm is in said second intermediate position, said first brush is electrically engaged with said second contact and said second brush is electrically engaged with said intermediate contact so as to drive said element at a second intermediate speed faster than said first intermediate speed and slower than said fast speed.

5. A drive control in accordance with claim 4 wherein said contact arm is mounted for pivotal movement, wherein said contacts are equi-angularly located about the axis of pivotal movement of said contact arm and wherein said first and second brushes are located at an angular distance from each other equal to the angular spacing of said contacts.

6. A drive control in accordance with claim 5 wherein said contacts and said brushes are located at the same radial distance from the axis of pivotal movement of said contact arm.

7. A drive control in accordance with claim 5 wherein one of said brushes is located at a lesser radial distance from the axis of pivotal movement of said contact arm than the other of said brushes and wherein at least one of said contacts has a radial length permitting electrical engagement with only one of said brushes, and wherein at least one of said contacts has a radial length permitting electrical engagement with both of said brushes.

8. A drive control comprising a frame, an element rotatably supported by said frame, a first direct current motor on said frame, means drivingly connecting said first direct current motor to said element with a first speed reducing ratio, a second direct current motor on said frame, means drivingly connecting said second direct current motor to said element with a second speed reducing ratio lower than said first speed reducing ratio, a source of direct current, and a switch mounted on said frame and electrically connected to said source of direct current and to said first and second direct current motors and including means for initially electrically connecting said direct current source to said first direct current motor whereby to drive said element at a slow speed, and for subsequently additionally electrically connecting said source of direct current to said second direct current motor while maintaining electrical connection of said direct current source to said first direct current motor, whereby to drive said element at a fast speed, said connecting means including a movably mounted contact arm having a first brush electrically connected to one of said first direct current motor and said source of direct current and a second brush electrically connected to one of said second direct current motor and said source of direct current, said contact arm being movable between an off position and a series of positions affording driving of said element at increasing speeds, a first series of contacts located for successive engagement by said first brush and including a first series of resistors electrically connected between said contacts of said first series thereof, and a second series of contacts located for successive engagement by said second brush and including a second series of resistors electrically connected between said contacts of said second series thereof, the last of said first series of contacts being electrically connnected to the other of said first direct current motor and said direct current source and located and dimensioned such that said first brush is engageable therewith simultaneously with electrical engagement of said second brush with said second series of contacts and the last of said second series of contacts being electrically connected to the other of said second direct current motor and said direct current source.

9. A drive control in accordance with claim 8 wherein said first series of contacts includes a first contact, a first resistor electrically connected to said first contact, a second contact electrically connected to said first resistor, a second resistor electrically connected to said second contact, and a third contact connected to said second resistor, and wherein said second series of contacts includes a fourth contact, a fourth resistor electrically connected to said fourth contact, a fifth contact electrically connected to said fourth resistor, a fifth resistor electrically connected to said fifth contact, and a sixth contact electrically connected to said fifth resistor.

10. A drive control comprising a frame, an element rotatably supported by said frame, a first direct current motor on said frame, first drive means drivingly connecting said first direct current motor to said element with a first speed reducing ratio, a second direct current motor on said frame, second drive means drivingly connecting said second direct current motor to said element independently of said first drive means and with a second speed reducing ratio lower than said first speed reducing ratio, a source of direct current, and a switch mounted on said frame and electrically connected to said source of direct current and to said first and second direct current motors and including means for initially electrically connecting said direct current source to said first direct current motor whereby to drive said element at a slow speed, and for subsequently additionally electrically connecting said source of direct current to said second direct current motor while maintaining electrical connection of said direct current source to said first direct current motor, whereby to drive said element at a fast speed.

11. A vehicle in accordance with claim 10 wherein said connecting means includes a movably mounted contact arm and further including a foot pedal mounted on said frame for movement, and means connecting said foot pedal to said contact arm for moving said contact arm in response to foot pedal movement.

* * * * *